United States Patent [19]

Hicks

[11] Patent Number: 4,951,086
[45] Date of Patent: Aug. 21, 1990

[54] METHOD FOR IMPROVING THE PRODUCTION OF PHOTOGRAPHIC REPRINTS

[76] Inventor: Ray Hicks, 2605 Corunna Road, Flint, Mich. 48503-3362

[21] Appl. No.: 336,849

[22] Filed: Apr. 12, 1989

[51] Int. Cl.⁵ .................. G03B 27/52; G03B 27/32
[52] U.S. Cl. ........................................ 355/41; 355/77
[58] Field of Search .................... 355/40, 41, 38, 77

[56] References Cited

U.S. PATENT DOCUMENTS

| | | | |
|---|---|---|---|
| 4,353,641 | 10/1982 | Merlo | 355/38 |
| 4,563,083 | 1/1986 | Shiota | 355/38 |
| 4,629,312 | 12/1986 | Pearce et al. | 355/41 X |
| 4,659,213 | 4/1987 | Matsumoto | 355/77 X |
| 4,823,163 | 4/1989 | Rollet et al. | 355/41 |

Primary Examiner—Richard A. Wintercorn
Attorney, Agent, or Firm—Krass & Young

[57] ABSTRACT

The invention is a method and associated device for recording, reading and transferring information regarding photographic prints. A photographic print is produced, and printed thereon are a series of human and machine readable codes. These code define various identification parameters which are used to locate a desired corresponding photograph negative from a collection of photograph negatives, such as a developed roll of film. The codes also define various exposure parameters which are used to regulate the exposure of photographic paper utilizing the negative so located. The codes may be electronically stored and modified. Photographic prints produced utilizing the process are, during the exposure process, imprinted with updated data codes, to be utilized in a similar fashion during subsequent re-printing cycles.

15 Claims, 3 Drawing Sheets

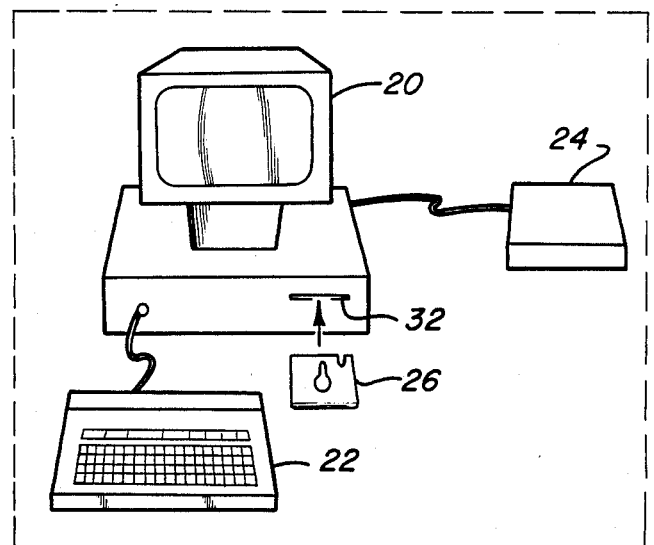
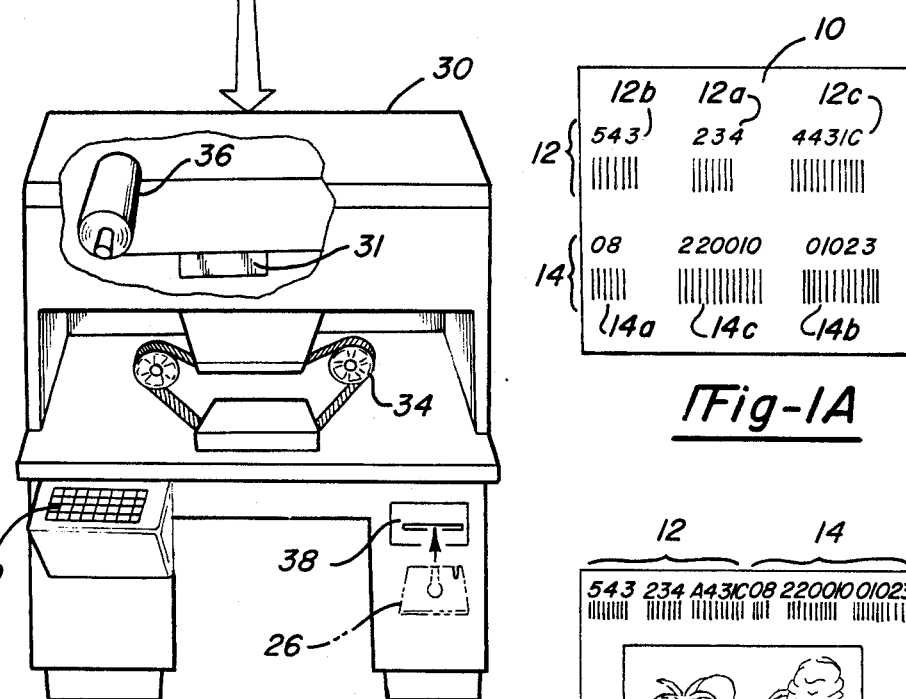
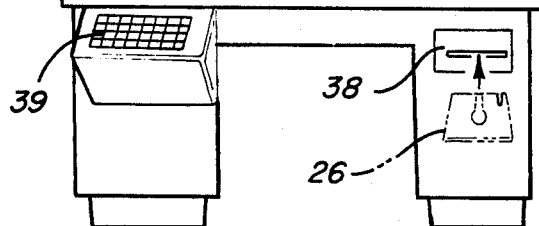
Fig-1A
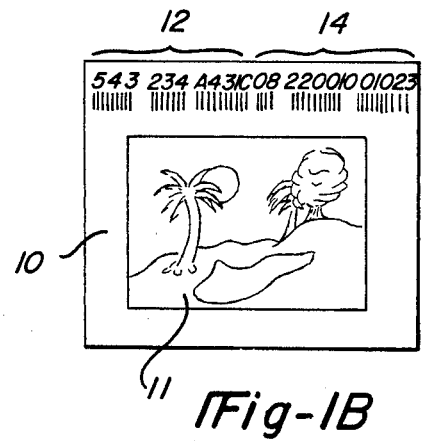
Fig-2
Fig-1B

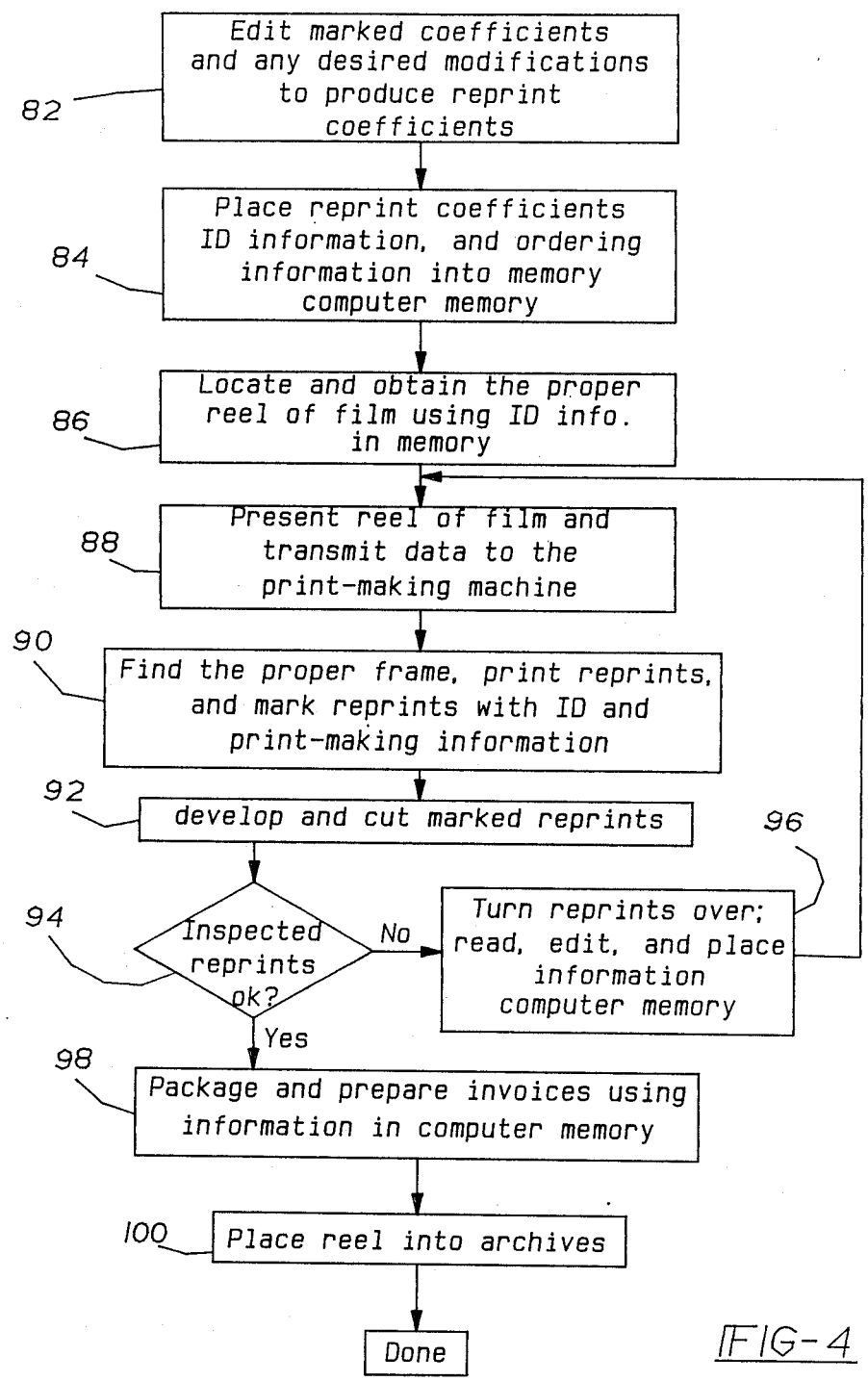

METHOD FOR IMPROVING THE PRODUCTION OF PHOTOGRAPHIC REPRINTS

FIELD OF THE INVENTION

This invention relates to methods using feedback to improve the quality of photographic reprints and of using automated equipment to produce reprints. The feedback loop involves communicating to an automated print-making machine the quantity and sizes of reprints, how the composition of a desired print should be modified, and marking information on the print to be reprinted. In turn, the print-making machine makes the reprints using the communicated information and marks the reprints with information usable when making further reprints.

BACKGROUND OF THE INVENTION

At present, when a consumer desires to order reprints of a photographic print supplied by a print-making facility (or reprints of a "proof" i.e., a sample photograph) he or she will request certain sizes and quantities of reprints (the order information). The image to be printed is indicated by including the print itself, or by including an identifying number, with the order information. The identifying number is typically either the expected number of frames after a specially designated frame or is a number photographed with the image. Generally, a consumer may request various numbers and sizes of prints, but no provision is available to the consumer to tell the print-making facility what portion of the print to reprint nor how the intensity and color balance are to be adjusted.

The print making facility, when it receives a reprint order, must obtain the negatives of the photograph to be reprinted and present the negatives and print-making information to the print-making machine. In addition to quantity and size information, a modern automated print-making machine must receive position (cropping), density (intensity), and color balance information (the print-making machine's color co-efficients). In production systems, at least some of the information used by the print-making machine the first time the film is printed is placed permanently on the film. A typical production system permanently marks each frame with small holes encoding one of several different allowed combinations of quantity and size, one of several allowed croppings, and one of several allowed intensity levels. Color balance information is supplied separately and is not saved. Thus, an operator at the print-making plant must manually find the proper reel of film, mount the reel on a viewing machine, and find the proper frame by counting frames or comparing images until a match is found. Then the operator must make a subjective decision regarding color balance, without knowing what factors were used at the time of the original printing, how the density should be changed from the original printing, and what cropping changes should be made. The operator must also give the print-making machine specific consumer order information. Preparing the automated print-making machine to make reprints is, accordingly, labor intensive and prone to error, and does not fully accommodate the consumer's wishes about changes in density, color balance, or cropping.

Further, since the co-efficients used by the print-making machine are not saved, if an inspection of the reprints reveals a need for further modifications to the co-efficients and the making of another set of reprints, the operator must essentially reperform the entire process above-described.

The invention is a method that overcomes the above limitations and improves efficiency by eliminating much of the manual effort, provides an effective storage means for the information needed to make a reprint, and provides a means for the consumer to express his or her instructions about changes in density, color balance, or cropping of photographic prints.

SUMMARY OF THE INVENTION

The invention comprises a photographic print marked with information (a marked print), a process to produce a marked print, methods using a marked print to improve the production of reprints, and methods for duplicating a marked print.

The invention also comprises a method of labelling of reels of film so they may be retrieved, placing unique machine readable frame numbers associatively with each frame of film, and associating the print-making machine with a printer capable of marking each print with information without affecting the appearance of the image on the print.

An advantage of the invention stems from its use of the technique of placement of permanent marks associatively with each frame on a roll of negatives. The invention uses this limited capability to place frame numbers associatively with each frame of film in lieu of placing some of the print-making information, as is presently typical. Because each reel is identifiable, it is a straight forward task to present the proper reel to the print-making machine. Because each frame is machine identifiable, the print-making machine, when presented with the frame number and proper reel, is able automatically to find the appropriate frame of film. This saves a significant amount of work otherwise required of an operator to search through a reel to find the proper frame. While the invention provides for the reel and frame to be identifiable, the invention also provides a means for storing the reel and frame information on a print so that it will be available to be communicated to the print-making machine.

A further advantage of the invention stems from the storage of the co-efficients that were used by a print-making machine to make the print to be reprinted in lieu of storing only some of the co-efficients used to make the first print, as is presently typical. The invention stores the last used co-efficients on the print itself. Because the last used co-efficients are available to be communicated to the print-making machine, the operator does not have to make any judgments, as are presently required, in order to cause the print-making machine to make a reprint that has virtually the same appearance as the print to be reprinted. An additional aspect of this advantage is the ability of the invention to store print-making co-efficients with a much higher resolution, unlike the present typical scheme where only a limited amount of resolution of the saved co-efficients is possible.

A still further advantage of the invention stems from the aforementioned storing of the co-efficients that were used to make the print to be reprinted. Because the last used co-efficients are readily available, the invention allows, in a straight forward way, the accommodation of a consumer's desire for modification of the stored (marked) co-efficients. A computer may be used to edit the last used co-efficients and any desired modifications to those co-efficients so as to produce a set of revised reprint print-making co-efficients.

A BRIEF DESCRIPTION OF THE DRAWINGS

One will better understand the present invention by referring to the following detailed description while consulting the accompanying drawings, where the same reference numerals are used to refer to the same steps or parts throughout the several views, and in which:

FIG. 1A is a view of the back of a marked print showing labelled human and machine readable markings.

FIG. 1B is a view of the front of a marked print showing human and machine readable markings, and the image.

FIG. 2 is a representation of the devices and materials used to make a marked print.

FIG. 4 is a flowchart of the steps of the method as envisioned in a second embodiment of the invention.

DETAILED DESCRIPTION OF THE PREFERRED EMBODIMENT OF THE PRESENT INVENTION

Figure 3:
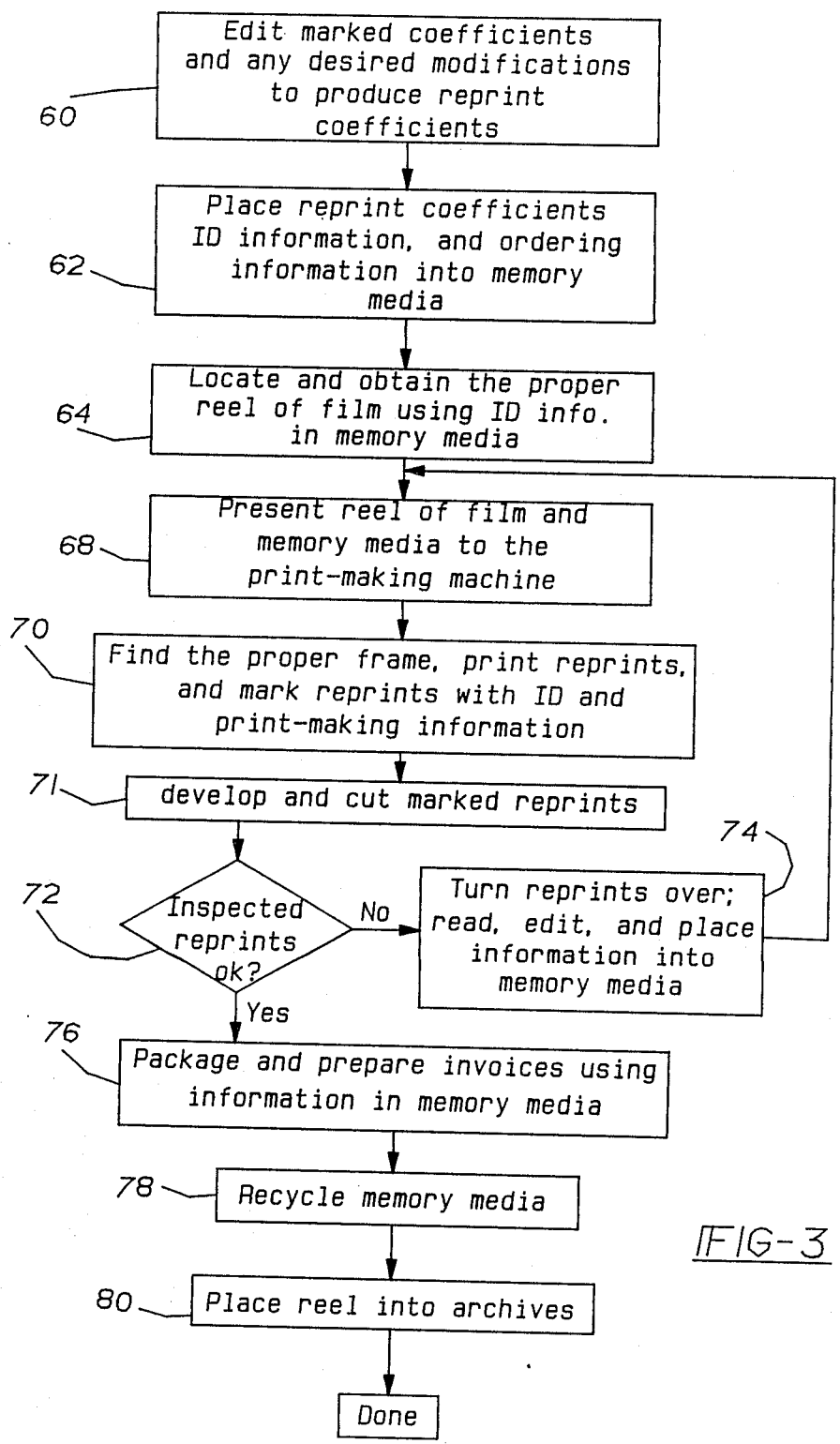
FIG. 3 is a flowchart of the steps of the method performed in the print-making plant.

The back of a photographic print produced using the preferred embodiment of the invention, contains a row or rows of numbers or symbols as shown in FIG. 1A. In an alternative embodiment, such numbers or symbols are marked on the front of the photographic print as shown in FIG. 1B. Such a print is designated a "marked print" 10. In the preferred embodiment, the marks are produced, during the print-making step, by a thermal printer that does not affect the appearance of the image 11 on the print 10. The marks are both human and machine perceptible (such as barcode 14a), and are placed on the back of the print.

The invention encompasses both the marking of information on prints and the using of that marked information in a method that improves the quality of photographic reprints and the efficiency of using automated equipment to produce reprints. The marked information consists of an identification series 12 and, a co-efficient series 14. The co-efficient series is used by the print-making machine when making the print to which the co-efficients 14 are attached. The ID series 12 includes reel number 12a, frame number 12b, and customer number 12c. The co-efficient series 14 includes density (intensity) information 14a, color balance (red, green, blue) information 14c, and position or cropping information 14b. The print-making machine may also utilize order information, including the quantity and sizes of prints to be made.

In the preferred embodiment, a reel number is placed on each reel 34 of photographic film and by placing a unique machine readable frame number near and associated with each frame of film. An example of the latter technique is the encoding of the frame number by punching a series of small encoding holes near the associated frame, holes hitherto used to encode some of the print-making co-efficients with limited resolution.

The devices and materials used by the preferred embodiment to make a marked print 10 are shown on FIG. 2. The ID series 12, co-efficient 14, modifications, and ordering information are presented to a computer 20. The computer's keyboard 22 or barcode reader 24 are used to import ID series 12 and co-efficient series 14 into the computer 20. The computer's keyboard 22 is used to import modifications and ordering information into the computer 20. The co-efficients 14 are edited in accordance with the modifications (which could include changes to the density 14a, color balance 14c, or position information 14b) to produce edited co-efficients to be used to make the reprints. Thereafter, those edited co-efficients, the ID information, and the ordering information are placed into suitable electronic memory media. In the preferred embodiment, the memory media comprises a computer readable diskette 26. However, in a networked environment, this data may be communicated directly from the computer 20 to the print-making machine 30, utilizing wiring, without the requirement to transportable media 26. The diskette 26 is presented to its drive 32 on the computer and drive 38 on the print-making machine 30. The print-making machine 30 is similar to that used in the co-pending application S/N07/172805, filed Mar. 28, 1988, entitled Automated Photographic Apparatus, of the same inventor. Using the ID series 12 (containing the reel number 12a), the proper reel of film 34 is located, and it, and a roll of unexposed photographic paper 36, are presented to the automated print-making machine 30. The print-making machine 30 is associated with, and controls, a printer 31 capable of marking human and machine readable information on the prints without distorting the image 11 on the marked print 10. The marks made by the printer 31 are at least durable enough to survive normal handling of the marked print 10.

The print-making machine 30 uses the presented proper reel of film 34, the roll of unexposed photographic paper 36, the information in the memory media, and the thermal printer 31 to make marked reprints. The print-making machine 30 finds the proper frame of film using the frame number 12b of the ID series 12 contained in the memory media and the unique machine readable frame numbers. A disk drive 38 connected to the printer 30 allows the data to be read, and a key pad 39 allows the data to be edited. Further, the print-making machine 30 exposes the proper frame of reel 34, using the edited co-efficients contained in the memory media, to make the reprints on photographic paper 36 in the sizes and quantities specified by the ordering information contained in the memory media. Still further, the print-making machine 30 causes the thermal printer 31 to mark the reprints with the ID series 12 and the now edited co-efficients used to make the reprints. The marked exposed photographic paper is developed, cut, and inspected in the usual fashion.

It is convenient to start a detailed description of the method of reprinting utilizing, initially, a marked print 10. The consumer communicates to the printing facility any desired modifications to the co-efficients used to print the marked print, together with ordering information. Examples of modifications to the co-efficients include: increasing or decreasing the density (also called intensity); changing the color balance (e.g. less red); and changing the portion of the negative to be printed (cropping). Examples of ordering information include: quantity of reprints and the sizes of reprints. In the preferred embodiment of the method, the consumer indicates any desired modifications and the ordering information by placing this information on a printed form. This ID series 12, co-efficient series 14, any desired modifications, and the ordering information are then delivered to the print-making plant.

The work cycle at the print-making plant is represented by flow chart FIG. 3B. In the print-making plant, three steps are performed utilizing the information sent by the consumer, prior to initiating the printing process. The information provided by the consumer is edited, stored, and used to retrieve the film negative from the archives. The editing step 60, includes revising the co-efficients to be presented to the print-making machine 30 so as to include the modifications desired by the consumer. Information, including the ID series 12, the revised co-efficient series, and the order information, is placed into a transportable memory media, step 62. The ID information 12 is used to find and to retrieve the proper reel of film to be printed 34, step 64.

The memory media contains certain information needed by the print-making machine 30 and all the information to be marked on the reprint. Each frames of reel 34 is permanently marked with a frame number. The proper reel of film 34 and the memory media are presented to the print-making machine 30, step 68. When the print-making machine 30 is used to make prints, as opposed to reprints, a reel of film and a memory media are presented to it in essentially the same manner as in block 68. The automatic print-making machine 30, using the information in the memory media 26, finds the proper frame, prints the requested quantity and sizes of reprints, and also causes a printer 31 to mark the back of each reprint with information, including ID series 12 and the edited print-making co-efficients 14 as used, step 70. The exposed photographic paper is developed, and then cut into marked reprints again using information from the memory media 26, step 71. The marked reprints are inspected, step 72. In step 74, those marked reprints found to have deficiencies are examined, the marked information is read, edited and re-entered into the memory media, and the memory media 26 and reel of film 34 are once again presented to the print-making machine 30. The satisfactory reprints are packaged and invoices prepared using the information the memory media 26, step 76. The memory media 26 is sent for recycling, step 78, the reel of film 34 is placed back into the archives, step 80, and the marked reprint is transmitted to the consumer. The consumer then has a marked print 10 that he or she may have reprinted, perhaps with some modifications, again utilizing the invention.

In a second embodiment of the invention, a permanent data link, such as wiring, between the computer 20 and the printer 30 may be substituted for removable media 26. The steps of this method are described with reference to FIG. 4, as follows:

The information provided by the consumer is edited, stored and used to retrieve the film negative from the archives, first, as shown in block 60, by revising the co-efficients to be presented to the print-making machine 30 so as to include the desired modifications. Information, including the ID series 12, the revised co-efficient series and order information is entered into computer memory, step 84.

Thereafter, utilizing the ID series 12, the proper reel of film 34 is located as shown in step 86. The reel of film 34 so located is placed in the print-making machine, and the edited data is transmitted from the computer directly to the print-making machine, step 88. Thereafter, using appropriate commands to the automated print-making machine, the proper frame of the reel film 34 is located and printed, using the data transmitted directly to the print-making machine from the computer memory.

Steps 92 through 100 of the method as set forth in FIG. 4 are essentially identical to steps 71 through 80 of FIG. 3, with the omission of step 78. Inasmuch as there is no memoried media used in this alternate embodiment, there is no need to recycle the memory media. It can be seen that this alternate embodiment is ideally suited to a network environment, whereby data regarding film processing and development can be shared by a number of computers and automated printing machines.

Although a preferred embodiment of the invention has been disclosed in detail, it will be recognized that variations or modifications lie within the scope of the present invention.

I claim as follows:

1. A method for producing photographic prints, comprising:
   a. Encoding frame and reel information on a photographic negative
   b. Viewing said photographic negative
   c. Establishing criteria for the exposure of photographic print paper from said negative
   d. Encoding said criteria, said frame information and said reel information in machine-readable form on said photographic print paper
   e. Producing a photographic print from said negative on said photographic print paper 2. The method of claim 1 which further comprises the step of printing of said criteria in human-readable form on said photographic print paper.

3. A method for producing photographic prints utilizing (1) a previously developed photograph print containing encoded, first machine readable data, and (2) a previously developed photographic negative containing encoded, second machine readable data, comprising:
   a. Machine-reading said first data from photographic prints
   b. Utilizing said first data to correlate said photographic print with one of said negatives
   c. Utilizing said second data to locate said negative
   d. Utilizing said first data to control an automated photographic printer 4. The method of claim 3, which further comprises the additional steps of:
   a. Storing said first data in electronic storage means
   b. Modifying said first data in said electronic storage means
   c. Utilizing said modified first data to control an automated photographic printer 5. A method for producing a photographic print comprising:
   a. Encoding frame and reel information on a photographic negative
   b. Viewing said photographic negative
   c. Establishing criteria for the exposure of photographic print paper from said negative
   d. Encoding said criteria, said frame information and said reel information in machine-readable form on said photographic print paper
   e. Producing a photographic print from said negative on said photographic print paper
   f. Machine reading said encoded criteria from said photographic print paper
   g. Utilizing said encoded criteria to correlate said photographic print with said photographic negative h. Utilizing said encoded criteria to produce a second photograph from said photographic negative 6. The method of claim 5, wherein said method of utilizing said encoded criteria to produce a second photograph further comprises the step of utilizing an automated photographic printer.

7. The method of claim 5, which further comprises the steps of:
   a. Storing said criteria in electronic storage means
   b. Modifying said criteria in said electronic storage means
   c. Utilizing said modified criteria to produce a third photograph 8. A marked photographic print made by a print-making machine adjusted by co-efficients, comprising:
   a. A photographic print
   b. A first set of marks on said photographic print indicative of the co-efficients used by the print-marking machine to make said photographic print, said first set of marks being machine perceivable
   c. A second set of marks on said photographic print indicative of information identifying the image shown on photographic print, said second set of marks being human perceivable.

9. A marked photographic print as recited in claim 8, wherein said first set of marks are further human perceptible.

10. A marked photographic print as recited in claim 8, wherein said second set of marks are further machine perceptible.

11. A marked photographic print as recited in claim 8, wherein both sets of said marks are on the back of said photographic print.

12. A marked photographic print as recited in claim 8, wherein both sets of said marks are on the front of said photographic print.

13. A marked photographic print as recited in claim 8, wherein said second set of marks includes the frame number of the image shown on said photographic print.

14. A marked photographic print as recited in claim 8, wherein said co-efficients include the density, color balance, and position information used by the print-making machine to make said photographic print.

15. A marked photographic print as recited in claim 8, wherein said second set of marks are further indicative of a customer number.

* * * * *